(12) United States Patent
Kawaguchi et al.

(10) Patent No.: US 7,133,475 B2
(45) Date of Patent: Nov. 7, 2006

(54) RADIO RECEIVER

(75) Inventors: Noriyuki Kawaguchi, Sapporo (JP); Morihiko Minowa, Kawasaki (JP); Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 10/113,736

(22) Filed: Apr. 1, 2002

(65) Prior Publication Data

US 2003/0081703 A1    May 1, 2003

(30) Foreign Application Priority Data

Oct. 30, 2001   (JP)   ............................ 2001-332509

(51) Int. Cl.
*H03K 9/00*       (2006.01)
*H04B 1/707*      (2006.01)
(52) U.S. Cl. .................. 375/346; 375/148; 375/149; 375/347
(58) Field of Classification Search ............. 375/346, 375/148, 149, 347
See application file for complete search history.

(56) References Cited

FOREIGN PATENT DOCUMENTS

JP    10-126331    5/1998
JP    11-355849    12/1999

*Primary Examiner*—Kevin Kim
(74) *Attorney, Agent, or Firm*—Katten Muchin Rosenman LLP

(57) ABSTRACT

The invention relates to a radio receiver which receives reception waves modulated with a frame being a sequence of slots and reproduces transmission information that is distributed to the slots. An object of the invention is to increase the reliability of channel inference and improve the transmission quality without substantially altering a basic configuration. A radio receiver of the invention performs quasi-synchronous detection on reception waves modulated with a frame; determines an error in a sequence of first vectors and a sequence of second vectors as an average of deviations of particular symbol positions to be indicated by the sequence of first vectors indicating a sequence of words included in each slot in a signal space, and the sequence of second vectors indicating known information included in the slots; and compensates for the error in the signal space.

36 Claims, 9 Drawing Sheets

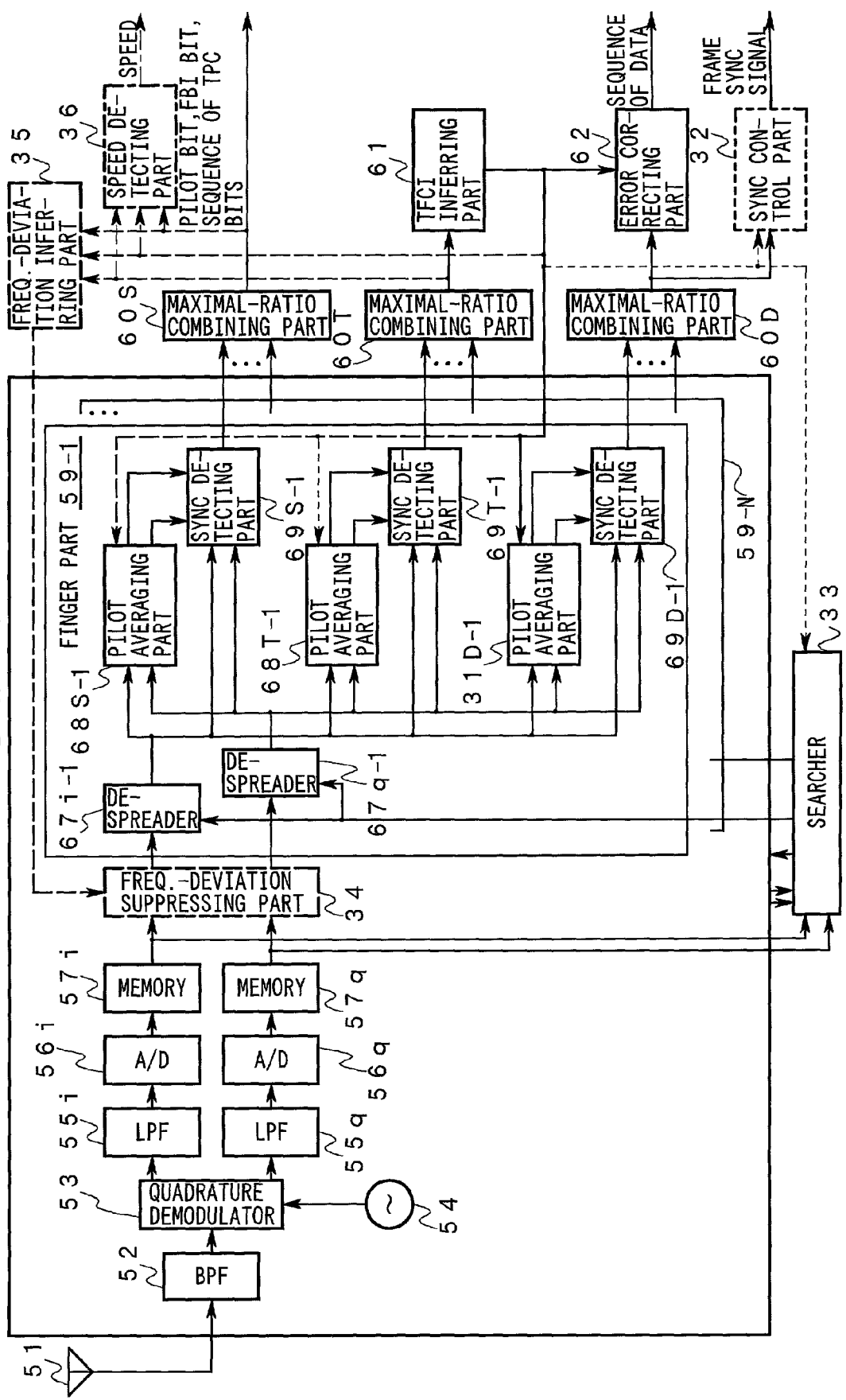

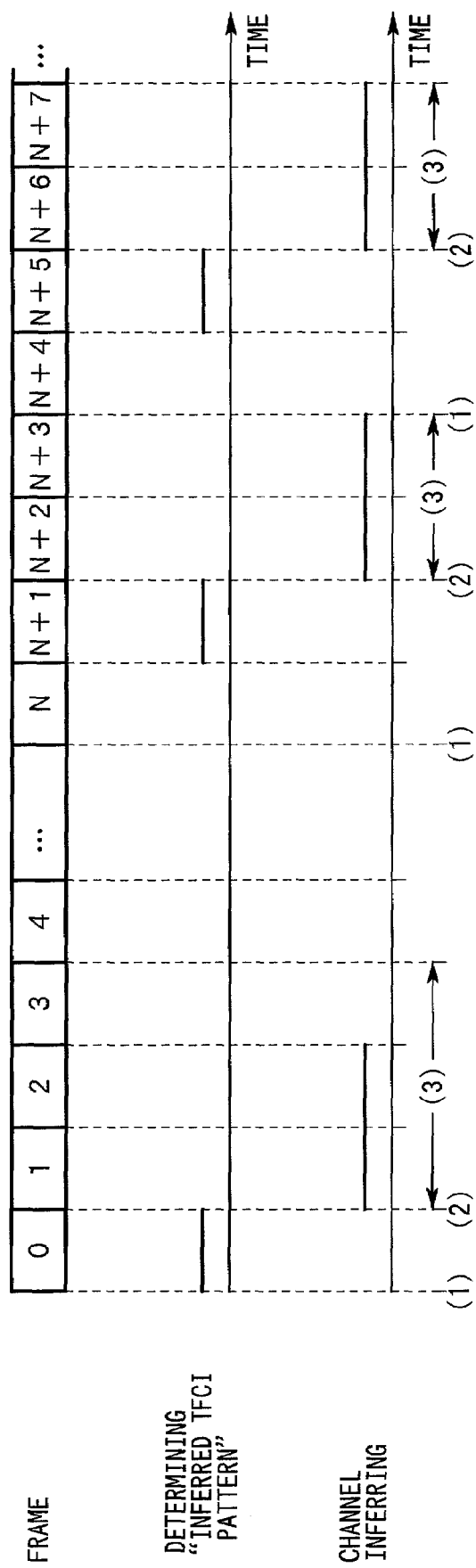

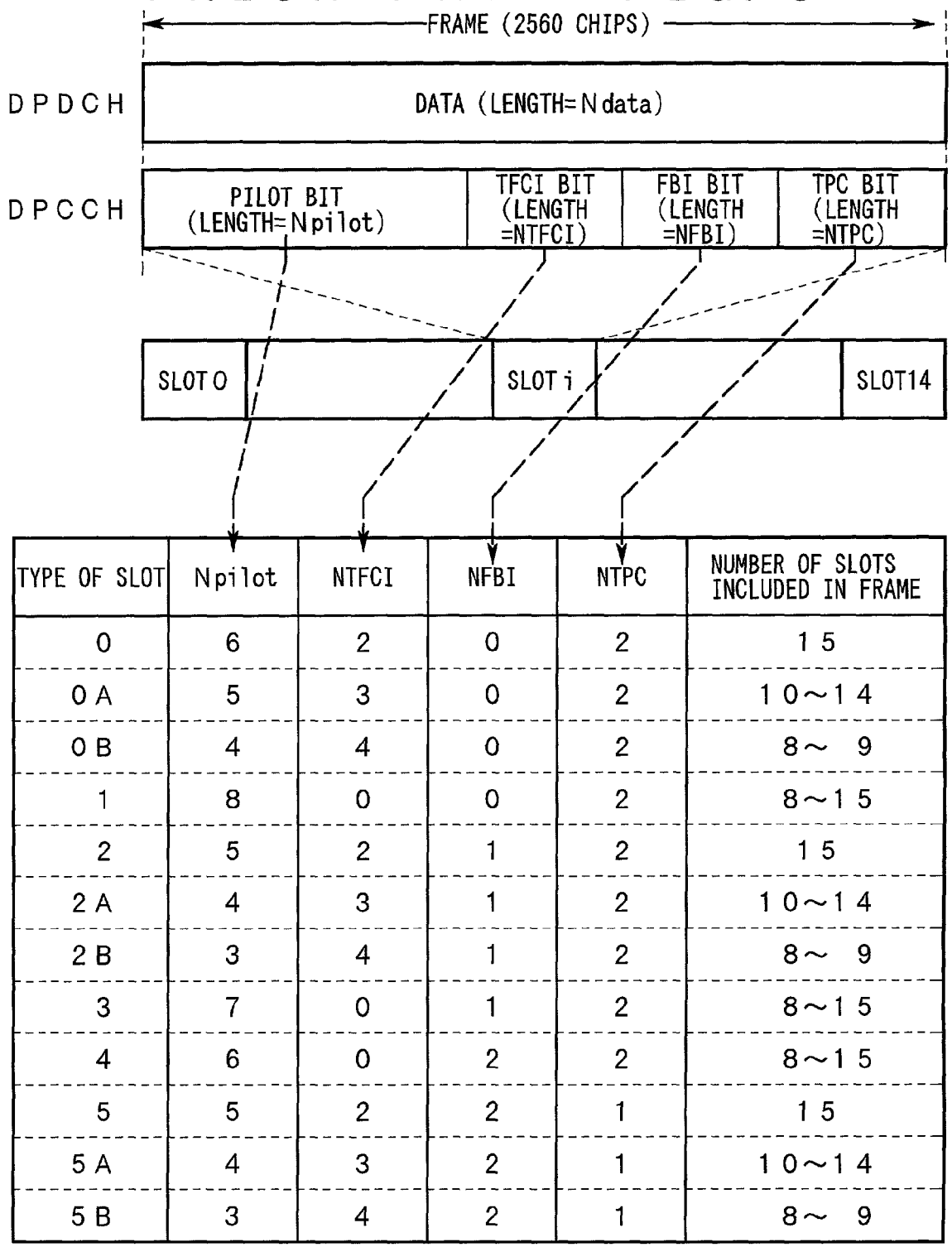

PRIOR ART  FIG. 9a
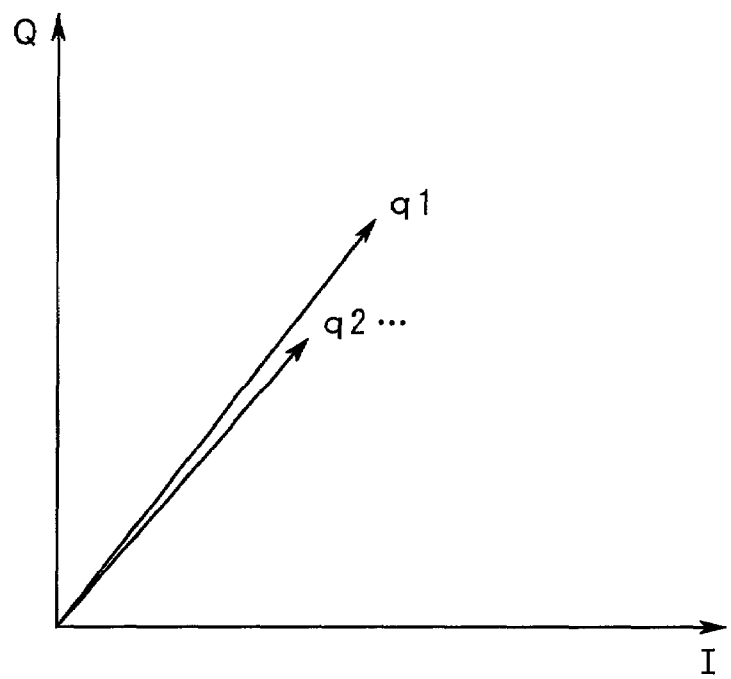
PRIOR ART  FIG. 9b
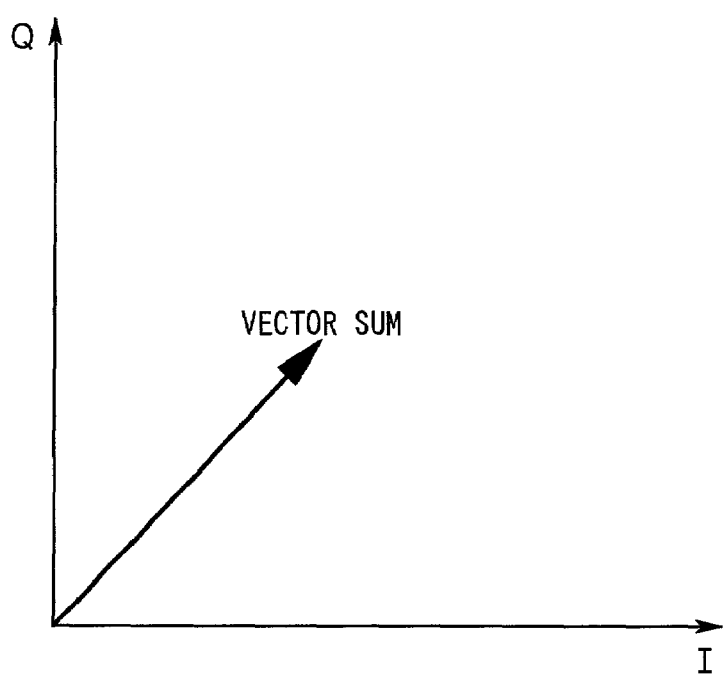

RADIO RECEIVER

BACKGROUND OF THE INVENTION

1. Field of the Invention

The present invention relates to a radio receiver which receives reception waves that are modulated with frames each being a sequence of a plurality of slots and restores transmission information that is distributed to the slots.

2. Description of the Related Art

The CDMA (code division multiple access) is a multiple access scheme that is superior in confidentiality and interference-resistibility and enables suppression of co-channel interference and effective use of radio frequencies.

With an additional advantage of enabling flexible setting of a radio transmission-characteristic for each sector cell with the aid of a technique of realizing, with high accuracy at high speed, transmission power control that is necessary to solve the near-far problem, the CDMA is applied to many mobile communication systems.

FIG. 7 shows the configuration of an exemplary radio receiver that is provided in a radio base station of a mobile communication system to which the CDMA is applied.

As shown in FIG. 7, the feeding point of an antenna 51 is connected to the input of a quadrature demodulator 53 via a bandpass filter (BPF) 52 and the output of a local oscillator 54 is connected to the local frequency input of the quadrature demodulator 53. One output of the quadrature demodulator 53 is connected to the writing port of a memory 57$i$ via a cascade-connected low-pass filter (LPF) 55$i$ and A/D converter (A/D) 56$i$, and the other output of the quadrature demodulator 53 is connected to the writing port of a memory 57$q$ via a cascade-connected low-pass filter (LPF) 55$q$ and A/D converter (A/D) 56$q$. The reading ports of the memories 57$i$ and 57$q$ are connected to a searcher 58 and corresponding inputs of a plurality of finger parts 59-1 to 59-N. The first to third inputs of each of the finger parts 59-1 to 59-N are connected to corresponding inputs of respective maximal-ratio combining parts 60S, 60T, and 60D. The maximal-ratio combining part 60S outputs a string of PILOT bits, FBI bits, and TPC bits (described later). The output of the maximal-ratio combining part 60T is connected to the control input of an error correcting part 62 via a TFCI inferring part 61. The output of the maximal-ratio combining part 60D is connected to a corresponding input of the error correcting part 62 and the input of a sync control part 63. The error correcting part 62 and the sync control part 63 output a sequence of data (described later) and a sync signal, respectively.

The finger part 59-1 is composed of the following components:

Despreaders 67$i$-1 and 67$q$-1 cascaded to the respective memories 57$i$ and 57$q$ and supplied with despreading codes from the searcher 58.

Pilot averaging parts 68S-1, 68T-1, and 68D-1 each having two inputs that are connected to the outputs of the despreaders 67$i$-1 and 67$q$-1, respectively.

Sync detecting parts 69S-1, 69T-1, and 69D-1 each of which has first to fourth inputs connected to the outputs of the despreaders 67$i$-1 and 67$q$-1 and the two outputs of the associated one of the pilot averaging parts 68S-1, 68T-1, and 68D-1 and whose outputs are connected to corresponding inputs of the maximal-ratio combining parts 60S, 60T, and 60D.

The finger parts 59-2 to 59-N are configured in the same manner as the finger part 59-1 is, and hence are not be described here. The components of the finger parts 59-2 to 59-N are given the same symbols as the corresponding components of the finger part 59-1 except that suffixes "2" to "N" are used in place of "1."

Further, in the following description, for items common to the finger parts 59-1 to 59-N, a suffix "C" meaning that it can be any of "1" to "N" will be used instead of the suffixes "1" to "N" for the sake of simplicity.

In the radio receiver having the above configuration, the bandpass filter 52 extracts a desired reception wave component from a radio-frequency signal arriving at the antenna 51. The quadrature demodulator 53 generates two orthogonal baseband signals I and Q by performing quasi-synchronous detection on the reception wave component based on a local frequency signal that is generated by the local oscillator 54 and has the same frequency as the nominal value of the reception wave component in prescribed accuracy.

The A/D converters 56$i$ and 56$q$ generate orthogonal discrete signals Id and Qd by oversampling the baseband signals I and Q in parallel by cooperating with the respective low-pass filters 55$i$ and 55$q$.

The memories 57$i$ and 57$q$ temporarily store the discrete signals Id and Qd in time-series order.

The searcher 58 performs the following processing parallel with processing of calculating correlations between the above-mentioned despreading codes and the discrete signals Id and Qd stored in the memories 57$i$ and 57$q$ over a period that is plural times the cycle of the despreading codes and calculating and storing a delay profile as a sequence of average values of the correlations over the cycle of the despreading codes:

Refers to the delay profile at intervals of the cycle of the despreading codes and assigns an available one of the finger parts 59-1 to 59-N to each time point when the value of the delay profile exceeds a prescribed threshold. Alternatively, resets the finger parts 59-1 to 59-N every time a delay profile is generated.

Gives orthogonal, two kinds of despreading codes that are in synchronism with above-mentioned time points to the two respective despreading parts (denoted by symbol "67") of finger parts that are assigned in the above-described manner.

In the finger part 59-C, the despreaders 67$i$-C and 67$q$-C generate despread signals i-C and q-C corresponding to the respective baseband signals I and Q by multiplying the discrete signals Id and Qd by the two kinds of despreading codes that are supplied from the searcher 58.

Incidentally, as shown in FIG. 8, the despread signal i-C is a sequence of frames (a channel that is formed as a sequence of such frames will be hereinafter referred to as "DPDCH") each consisting of 15 slots that are arranged continuously in time-series order and each of which consists of a single field that has a constant word length Ndata and is to accommodate data to be transmitted.

For example, as shown in FIG. 8, the despread signal q-C is a sequence of frames (a channel that is formed as a sequence of such frames will be hereinafter referred to as "DPCCH") each consisting of 15 slots that are arranged continuously in time-series order and each of which consists of four fields to accommodate the following four respective kinds of bits:

PILOT bits that are given as a known bit string having a word length Npilot of 3–8 bits and are used for slot-by-slot synchronization.

TFCI (transport format combination indicator) bits that are unique bits or a bit string that has a word length NTFCI of 0–4 bits, belongs to a code sequence having a steep autocorrelation characteristic and a gentle and small cross-correlation characteristic, and indicates a format of the slot to which the TFCI bits belong.

FBI (feedback indicator) bits that have a word length NFBI of 0–2 bits and are used for transmission diversity.

TPC (transmission power control) bits that have a word length of 1 or 2 bits and are used for the above-mentioned transmission power control.

Combinations of the numbers of bits that the above four bit strings can have are shown in the bottom part of FIG. 8. However, they are not described here because they do not directly relate to the invention.

Cooperating with the searcher 58, the pilot averaging parts 68S-C, 68T-C, and 68D-C perform channel inference by, for example, calculating, in parallel, according to the WMSA (weighted multi-slot averaging) scheme, averages (hereinafter referred to as "average vectors"; see FIG. 9B) of vectors q1, q2, . . . (see FIG. 9A) each of which represents, in the signal space, despread signals i-C and q-C in the period of a field that should accommodate PILOT bits (described above) among the fields of each slot.

Cooperating with the searcher 58, the sync detecting part 69S-C sequentially outputs, one by one, the sum (hereinafter referred to as "first demodulation signal") S-C of a despread signal q-CS that corresponds to the difference between the sum (hereinafter referred to as "vector sum S") of vectors representing, in the signal space, the despread signal q-CS in the periods of fields to accommodate FBI bits and TPC bits (described above) among the fields of each slot belonging to a DPCCH and the average vector calculated by the pilot averaging part 68S-C.

Cooperating with the searcher 58, the sync detecting part 69T-C sequentially outputs, one by one, the sum (hereinafter referred to as "second demodulation signal") T-C of a despread signal q-CT that corresponds to the difference between the sum (hereinafter referred to as "vector sum T") of vectors representing, in the signal space, the despread signal q-CT in the period of a field to accommodate TFCI bits (described above) among the fields of each slot belonging to the DPCCH and the average vector calculated by the pilot averaging part 68T-C.

Cooperating with the searcher 58, the sync detecting part 69D-C sequentially outputs, one by one, the sum (hereinafter referred to as "third demodulation signal") D-C of a despread signal i-CD that corresponds to the difference between the sum (hereinafter referred to as "vector sum D") of vectors representing, in the signal space, the despread signal i-CD in the period of a single field to accommodate data (described above) among the fields of each slot belonging to a DPDCH and the average vector calculated by the pilot averaging part 68D-C.

The maximal-ratio combining part 60S maximal-ratio-combines the first demodulation signals S-1 to S-N that are output parallel from the sync detecting parts 69S-1 to 69S-N that are provided in the respective finger parts 59-1 to 59-N, and thereby generates a demodulation signal SRAKE that indicates values of fields to accommodate PILOT bits, FBI bits, and TPC bits and is to become a subject of decision decoding on these PILOT bits, FBI bits, and TPC bits.

The maximal-ratio combining part 60T maximal-ratio-combines the second demodulation signals T-1 to T-N that are output parallel from the sync detecting parts 69T-1 to 69T-N that are provided in the respective finger parts 59-1 to 59-N, and thereby outputs a demodulation signal TRAKE that indicates values of fields to accommodate TFCI bits (may include bit errors due to transmission errors).

The TFCI inferring part 61 infers, based on an autocorrelation characteristic (mentioned above), a string of most probable TFCI bits (hereinafter referred to as "inferred TFCI pattern") that is indicated by the demodulation signal TRAKE.

The maximal-ratio combining part 60D maximal-ratio-combines the third demodulation signals D-1 to D-N that are output parallel from the sync detecting parts 69D-1 to 69D-N that are provided in the respective finger parts 59-1 to 59-N, and thereby outputs a demodulation signal DRAKE that indicates data (described above; may include bit errors due to transmission channel errors).

The error correcting part 62 performs decoding processing (e.g., Viterbi decoding or turbo decoding) that complies with a prescribed channel coding scheme on the demodulation signal DRAKE, and thereby outputs a sequence of data in which bit errors that have occurred in the radio transmission channel are corrected.

Standard vectors that indicate a known frame sync pattern (FSW) in time-series order and indicate a sequence of regular symbol positions to be contained in the demodulation signal DRAKE according to a prescribed frame formation are given to the sync control part 63 in advance or when necessary according to a channel control procedure.

The sync control part 63 correlates the demodulation signal DRAKE with the standard vectors thus given and generates a sync signal indicating time points when the correlation result exceeds a prescribed threshold and has a local maximum.

Therefore, the demodulation and decoding of reception waves are performed with high reliability under the channel inference that is performed in such a manner that fields accommodating known PILOT bits that are included in each slot are used as references.

Incidentally, in the above conventional example, the channel inference is performed based on only PILOT bits and a signal indicating fields accommodating PILOT bits among the fields of a plurality of slots in the signal space is integrated in the channel inference process.

Therefore, the configuration of the conventional example has limitations not only in the adaptability to systems according to the provisions of the 3GPP (Third Generation Partnership Project) but also in the capabilities of providing a variety of added values and improving the performance (following three points):

Since the length of fields to accommodate PILOT bits is not necessarily kept constant, there is a possibility that desired high response speed and high accuracy of the synchronous detection cannot be attained with high reliability in a stable manner.

During a compressed mode, the level of reception waves lowers. However, resulting deterioration in transmission quality is not necessarily considered sufficiently in determining the specifications of various systems. Therefore, sufficient margins in performance are not secured.

However, particularly in the fields of mobile communication systems and wireless LANs in which the number of subscribers and the transmission capacity are expected to increase, advantages in price and performance as well as capability of future expansion are strongly required.

The above problems may be made less serious or solved through application of a prior art technique of realizing synchronous detection and elimination of interference by provisionally deciding data symbols that do not correspond to PILOT bits (see Japanese Patent Laid-Open No. 355849/1999, for example).

However, in practice, it is difficult in some cases to use such a prior art technique because it is complex in configuration in the following points and requires a large amount of processing:

The above-mentioned provisional decision can be made only after a string of TFCI bits is decoded and identified, despreading processing is performed based on a spreading factor SF suitable for the string of TFCI bits, and data obtained as a result of the despreading processing are detected synchronously.

Even after such provisional decision has been made, data (described above) should be detected again after being stored temporarily.

SUMMARY OF THE INVENTION

An object of the present invention is to provide a radio receiver capable of increasing the reliability of channel inference and improving the transmission quality without substantially altering the basic configuration.

Another object of the invention is to heighten the transmission quality compared with the conventional example without substantially altering the basic configuration.

Another object of the invention is to realize flexible adaptation to a mobile communication system in which multipaths may be formed whose transmission-characteristics vary with time.

Another object of the invention is to realize flexible adaptation to a variety of frame configurations.

Another object of the invention is to increase the accuracy and the stability of quasi-synchronous detection or synchronous detection and to maintain high transmission quality.

Another object of the invention is to improve the transmission quality and the reliability by utilizing a result of channel inference.

Yet another object of the invention is to maintain high stable accuracy of channel inference even when a modulation scheme or a frame formation, in which words indicated by first vectors may include bits or words that prevent determination of a sequence of words based on a steep autocorrelation characteristic, is employed.

Still another object of the invention is to maintain high reliability and transmission quality with stability.

A further object of the invention is to improve the reliability and the transmission quality.

Another object of the invention is to increase the reliability of channel control and call setting that are performed according to procedures that conform to the speed of a transmitting end, and to maintain high reliability and service quality.

Another object of the invention is to maintain high stable transmission quality and reliability by utilizing, as known information, words having a steep autocorrelation characteristic and a small and gentle cross-correlation characteristic in the signal space, even in the case where one or both of known information such as a sync word included in each frame, and words are set or updated according to the channel control procedure or the call setting procedure.

Another object of the invention is to reduce throughput necessary for channel inference and to increase the efficiency of the channel inference.

Another object of the invention is to maintain transmission quality and performance on high average.

Another object of the invention is to realize flexible adaptation to a variety of frame formations and increase the frequency of channel inference.

Another object of the invention is to realize flexible adaptation to radio transmission systems having a variety of configurations.

Still another object of the invention is to simplify the processing to be performed by a channel inferring section and a transmission-characteristic compensating section unless a period when the aforesaid words are not updated is unduly long.

Yet another object of the invention is to achieve reduction in throughput and power consumption.

A further object of the invention is to improve the service quality and the reliability without increasing the cost to a large extent, heighten a variety of added values, and realize flexible adaptation to a variety of needs, and to secure resources necessary for such adaptation in a radio transmission system to which the invention is applied.

The invention provides a radio receiver which performs quasi-synchronous detection on a signal that is modulated with a frame consisting of a sequence of slots each of which includes known information and may include words having a steep autocorrelation characteristic and a small and gentle cross-correlation characteristic; determines an error in first vectors and second vectors in a signal space as an average of deviations of particular symbol positions to be indicated by a sequence of first vectors and a sequence of second vectors, the sequence of first vectors indicating the sequence of words included in the respective slots, the sequence of second vectors indicating known information included in the slots; and compensates for the error in the signal space.

In this radio receiver, channel inference is performed by determining an error in symbols indicated by not only second vectors indicating known information but also first vectors indicating words that are inferred with high reliability based on the steep autocorrelation characteristic and are likely to be regarded as known like the known information is.

There may be provided a radio receiver which is comprised of a plurality of sections corresponding to respective fingers to be RAKE combined, for compensating in parallel for errors for each finger; obtains a delay profile as a distribution, on the time axis, of correlations between the formation of the frame and components indicating the sequence of first vectors and the sequence of second vectors among components received in parallel via radio transmission channels, which are formed as multipaths and through which the signal propagates; and performs frame synchronization based on the delay profile.

With this configuration, a delay profile is determined as a distribution, on the time axis, of correlations between the formation of the frames and components indicating not only a sequence of second vectors indicating the known information included in each frame but also a sequence of second vectors indicating the words that are inferred with high reliability based on the steep autocorrelation characteristic and are likely to be regarded as known like the known information is, among components of baseband signals received via the radio transmission channels.

The above objects are achieved by a radio receiver in which a newly extracted sequence of second vectors may be compensated for an error that has been previously obtained.

With this configuration, a result of the channel inference is also used for suppressing an error in a sequence of second vectors indicating, in the signal space, known information included in each frame.

The above objects are achieved by a radio receiver in which a newly obtained error may be compensated for an error that has been previously obtained.

With this configuration, channel inference reflects a result of channel inference that has been previously performed.

The invention provides a radio receiver which performs synchronous detection instead of quasi-synchronous detection and directly or indirectly compensates for errors in the phase and amplitude of a local frequency signal used for the synchronous detection.

In this radio receiver, channel inference is performed by determining an error in symbols included in not only second vectors indicating known information but also first vectors indicating words that are reliably inferred based on the steep autocorrelation characteristic and are likely to be regarded as known like the known information is.

The invention provides a radio receiver which determines the sequence of words based on the autocorrelation characteristic and calculates an average of the deviations of vectors corresponding to the particular symbol positions according to an operation procedure that conforms to the sequence of words.

With this configuration, the channel inference is performed with stability and accuracy as long as the formation of frames or all or part of the slots included in the frames is determined uniquely based on the above sequence of words, even in the case where the formation may vary.

The above objects are achieved by a radio receiver which extracts, from the words included in the respective slots, a sequence of first vectors as a sequence of vectors indicating a word that directly corresponds to a symbol position in the signal space and conforms to a modulation scheme used for generating the received signal and the formation of the frames.

With this configuration, such a sequence of first vectors is, even if located at one or both of the head and the tail of the words, extracted as a set of vectors each of which can indicate some symbol position even without being combined with a word or bits preceding or following the former word.

The above objects are achieved by a radio receiver which performs frame synchronization based on a correlation between the baseband signal and the words having the steep autocorrelation characteristic.

With this configuration, frame synchronization can be performed with stability and reliability for frames including the aforesaid words, even when individual frames do not include a sync word.

The above objects are achieved by a radio receiver which performs frame synchronization based on a correlation between the baseband signal and the words having the steep autocorrelation characteristic and a correlation between the baseband signal and sync words included in the frames.

With this configuration, frame synchronization can be performed with stability and high reliability even in the case where the sync words may have many bit errors due to disturbance or deterioration in the transmission-characteristic of a transmission channel.

The above objects are also achieved by a radio receiver which performs frame synchronization based on a correlation between the baseband signal and sync words included in the frames and on a correlation between the baseband signal and the words indicated by the sequence of first vectors.

With this configuration, frame synchronization is frequently performed at a cycle shorter than the length of frame, based on either of sync words and the aforesaid words that are regarded as known information as the sync words are.

The above objects are achieved by a radio receiver which maintains the frequency of the local frequency signal used for the quasi-synchronous or synchronous detection at such a value that a variation rate of the phase of the obtained error is suppressed, or corrects the frequency to the value in the baseband domain.

With this configuration, a phase variation in the above-mentioned error is generally caused due to a frequency deviation of the local frequency signal used for the quasi-synchronous or synchronous detection, and it is proportional to the frequency deviation.

The above objects are achieved by a radio receiver which determines a speed of a transmitting end of a signal according to a frequency at which a cross-correlation between the extracted sequence of first vectors and sequence of second vectors and symbol positions varies. The symbol positions signifies the words and known information to be indicated by the first vectors and the second vectors, respectively.

With this configuration, a speed of the transmitting end is determined with reliability and stability even in the case where sync words included in respective frames may have a lot of bit errors due to disturbance or deterioration in transmission-characteristic.

The above objects are achieved by a radio receiver in which particular symbol positions may be given according to one or both of a channel control procedure and a call setting procedure.

With this configuration, it is possible to maintain high stable transmission quality and reliability by utilizing the above-mentioned words as known information in the signal space, even in the case where one or both of known information such as sync words included in each frame and the words are set or updated according to the channel control procedure or the call setting procedure.

The above objects are realized by a radio receiver in which the particular symbol positions may be known and known to be included in both of the sequence of first vectors and the sequence of second vectors.

With this configuration, the processing of identifying the particular symbol positions is omittable.

The above objects are realized by a radio receiver in which the number of the particular symbol positions may be set to a larger value as the received signal has lower quality.

With this configuration, the processing of identifying the particular symbol positions is performed with efficiency and reliability without the need for securing an unduly large throughput unless the quality of the signal deteriorates to a large extent.

The above objects are achieved by a radio receiver which determines a sequence of first vectors in order for each sequence of a minimum number of symbols whose autocorrelation characteristic is possibly regarded as steep.

With this configuration, a sequence of first vectors to be used for the channel inference is determined at a high frequency even if the words are not collected nor packed in the word lengths of the words or the frame period as long as the autocorrelation characteristic is assured.

The above objects are realized by a radio receiver which determines a sequence of first vectors in order for each sequence of a number of symbols that conforms to one or both of a channel control procedure and a call setting procedure.

With this configuration, the channel inference is performed at a frequency that conforms to forms of channel control and call setting, even in the case where the words may be updated during the course of the channel control or call setting.

The above objects are achieved by a radio receiver which identifies a sequence of particular slots that conform to one or both of the channel control procedure and the call setting procedure and whose words should be uniform, and compensates all or part of symbols indicating the sequence of particular slots for an error obtained first for each actually identified sequence of particular slots.

With this configuration, repetition of determining an error is omittable from the channel inference processing in a period when the words are not updated.

The above objects are realized by a radio receiver in which repetition of determining an error for each actually identified sequence of particular slots is omitted.

With this configuration, unnecessary processing, which is obtaining errors not referred to during the course of the above processing, is not performed.

The above objects are realized by a radio receiver in which repetition of extracting a sequence of first vectors for each actually identified sequence of particular slots is omitted.

With this configuration, a sequence of first vectors is not extracted in a period when no error is compensated.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 is a block diagram showing second to fifth embodiments of the invention;

FIG. 5 is an operation time chart of a third embodiment of the invention;

FIG. 8 is a chart showing a frame formation that is applied to an upstream link; and FIGS. 9A and 9B are graphs showing operation of the conventional example.

DESCRIPTION OF THE PREFERRED EMBODIMENTS

First, the principles of radio receivers according to the present invention will be described with reference to a block diagram of FIG. 1.

Figure 1:
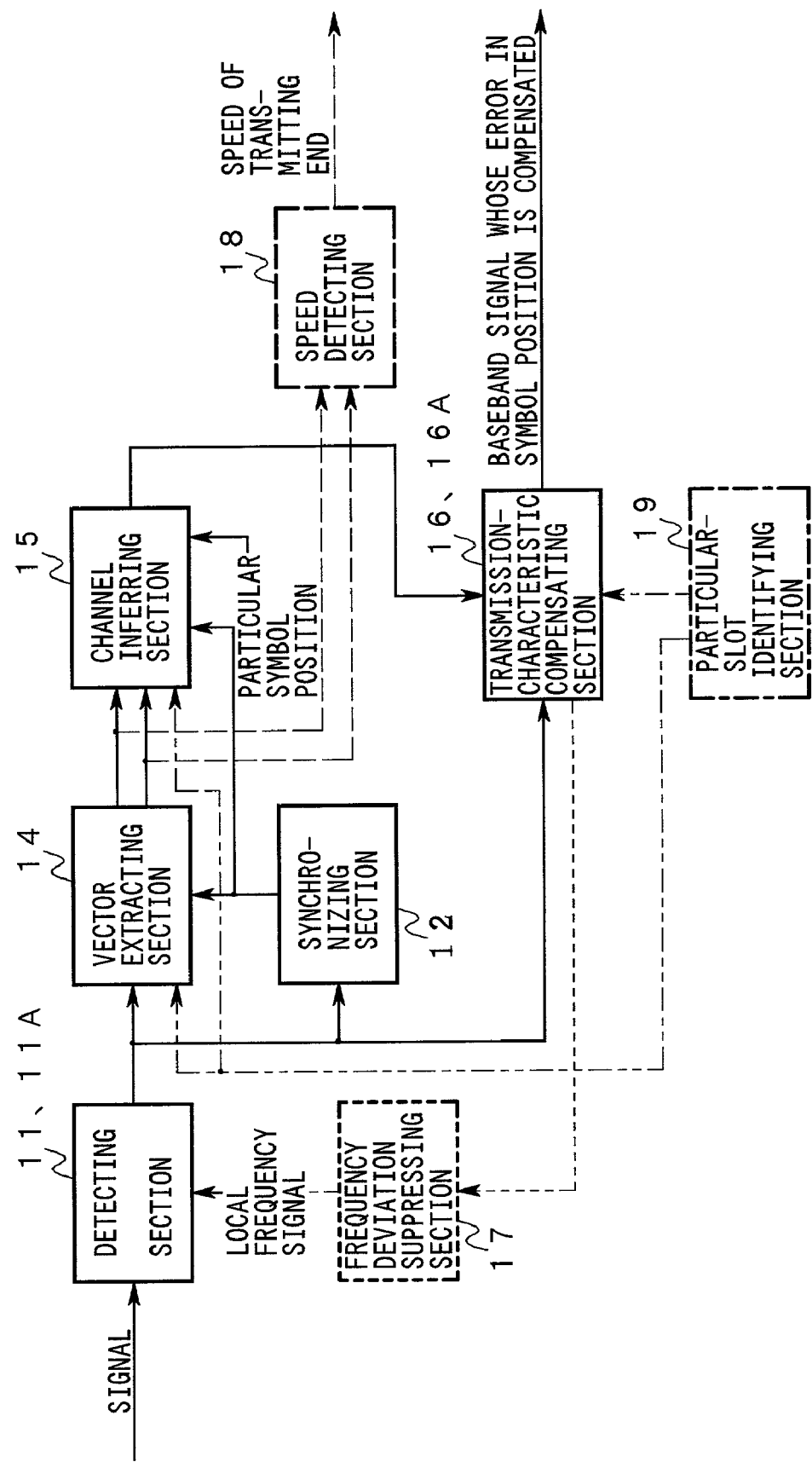
FIG. 1 is a block diagram showing the principles of the present invention.

FIG. 1 is a block diagram showing the principles of the present invention.

Radio receivers shown in FIG. 1 consist of (part of) a detecting section 11 or 11A, a synchronizing section 12, a vector extracting section 14, a channel inferring section 15, a transmission-characteristic compensating section 16 or 16A, a frequency deviation suppressing section 17, a speed detecting section 18, and a particular-slot identifying section 19.

The principle of a first radio receiver according to the invention is as follows.

The detecting section 11 performs quasi-synchronous detection on a signal that is modulated with frames each consisting of a sequence of slots each of which includes known information and can include words having a steep autocorrelation characteristic and a small and gentle cross-correlation characteristic, and thereby outputs a baseband signal. The synchronizing section 12 performs frame synchronization with frames indicated by the baseband signal. The vector extracting section 14 extracts a sequence of first vectors indicating the sequence of words included in the respective slots and a sequence of second vectors indicating the known information included in the slots by analyzing the baseband signal based on a formation of the frames in the frame-synchronized state. The channel inferring section 15 obtains, in a signal space, an error in the first vectors and the second vectors based on deviations of particular symbol positions to be indicated by the sequence of first vectors and the sequence of second vectors. The transmission-characteristic compensating section 16 compensates vectors indicating the baseband signal in the signal space for the error obtained by the channel inferring section 15.

That is, channel inference is performed by determining an error in symbols indicated by not only second vectors indicating known information but also first vectors indicating words that can be inferred with high reliability based on the steep autocorrelation characteristic and can be regarded as known like the known information is.

This makes it possible to heighten the transmission quality without substantially altering the basic configuration, compared with the conventional example in which the channel inference is performed by determining an error in symbols indicated only by first vectors.

The principle of a second radio receiver according to the invention is as follows.

The transmission-characteristic compensating section 16 is comprised of a plurality of sections corresponding to respective fingers to be RAKE combined, for compensating, in parallel for the fingers, for the error obtained by the channel inferring section 15. The synchronizing section 12 determines a delay profile as a distribution, on the time axis, of correlations between the formation of the frames and components indicating the sequence of first vectors and the sequence of second vectors extracted by the vector extracting section 14 among components of baseband signals received in parallel via radio transmission channels that are formed as multipaths and through which the signal transmits, and performs frame synchronization with the baseband signals based on the delay profile.

That is, a delay profile is determined as a distribution, on the time axis, of correlations between the formation of the frames and components indicating not only a sequence of second vectors indicating the known information included in each frame but also a sequence of first vectors indicating the words that can be inferred with high reliability based on the steep autocorrelation characteristic and can be regarded as known like the known information is, among components of baseband signals received via radio transmission channels as mentioned above.

Therefore, the second radio receiver is adaptable, as a RAKE receiver capable of securing high transmission quality, to a mobile communication system in which multipaths may be formed whose transmission-characteristics vary with time.

The principle of a third radio receiver according to the invention is as follows.

The vector extracting section 14 compensates the sequence of second vectors extracted by the vector extracting section 14 for an error that was previously obtained by the channel inferring section 15.

That is, a result of the channel inference performed by the channel inferring section 15 is also used for suppressing an error in a sequence of second vectors indicating, in the signal space, known information included in each frame.

Therefore, the transmission quality and the reliability are improved or increased and kept high by utilizing a result of such channel inference.

The principle of a fourth radio receiver according to the invention is as follows.

The channel inferring section 15 compensates an error obtained by itself for a previously obtained error by itself.

That is, a result of channel inference reflects its previously obtained result of channel inference performed by the channel inferring section 15.

Utilizing such results of channel inference improves the transmission quality and the reliability.

The principle of a fifth radio receiver according to the invention is as follows.

The detecting section 11A performs synchronous detection on a signal that is modulated with frames each consisting of a sequence of slots each of which includes known information and can include words having a steep autocorrelation characteristic and a small and gentle cross-correlation characteristic, and thereby outputs a baseband signal. The synchronizing section 12 performs frame synchronization with frames indicated by the baseband signal. The vector extracting section 14 extracts a sequence of first vectors indicating the sequence of words that are included in the respective slots and a sequence of second vectors indicating the known information included in the slots by analyzing the baseband signal based on a formation of the frames in the frame-synchronized state. The channel inferring section 15 obtains, in a signal space, an error in the first vectors and the second vectors based on deviations of particular symbol positions to be indicated by the sequence of first vectors and the sequence of second vectors. The transmission-characteristic compensating section 16A keeps one or both of a phase and an amplitude of a local frequency signal used for the synchronous detection at such a value that the error obtained by the channel inferring section 15 is suppressed, or corrects one or both of the phase and the amplitude of the local frequency signal to the value in the baseband domain.

That is, channel inference is performed by determining an error in symbols included in not only second vectors indicating known information but also first vectors indicating words that can be inferred with high reliability based on the steep autocorrelation characteristic and can be regarded as known like the known information is.

This makes it possible to heighten the transmission quality without substantially altering the basic configuration, compared with the conventional example in which the channel inference is performed by determining an error in symbols indicated only by first vectors.

The principle of a sixth radio receiver according to the invention is as follows.

The vector extracting section 14 determines the sequence of words by analyzing the baseband signal based on the autocorrelation characteristic in the signal space. The channel inferring section 15 calculates, in the signal space, an average of the deviations of the particular symbol positions to be indicated by the first vectors and the second vectors according to an operation procedure that conforms to the sequence of words determined by the vector extracting section.

With this measure, the channel inference is performed by the channel inferring section 15 with stability and accuracy as long as the formation is determined uniquely based on the above sequence of words, even in the case where the formation of frames or all or part of the slots included in the frames may vary.

This enables flexible adaptation to a variety of frame formations.

The principle of a seventh radio receiver according to the invention is as follows.

The vector extracting section 14 extracts, among the words included in the respective slots, a sequence of first vectors as a sequence of vectors indicating words that directly correspond to some symbol positions in the signal space and conform to a modulation scheme that was used for generating the received signal and the formation of the frames.

That is, such a sequence of first vectors is, even if located at one or both of the head and the tail of the word, extracted as a set of vectors each of which can indicate a symbol position even without being combined with a word or bits preceding or following the former word.

Therefore, high accuracy of the channel inference can be maintained with stability even in the case where an employed modulation scheme or frame formation is the one in which words indicated by first vectors may include bits or words that tend to prevent their determination based on the steep autocorrelation characteristic.

The principle of an eighth radio receiver according to the invention is as follows.

The synchronizing section 12 performs frame synchronization based on a correlation between the baseband signal and the words having the steep autocorrelation characteristic.

With this measure, frame synchronization can be performed in a stable and reliable manner for frames including the words even in the case where frames do not always include a sync word.

This enables flexible adaptation to a variety of frame formations.

The principle of a ninth radio receiver according to the invention is as follows.

The synchronizing section 12 performs frame synchronization based on a correlation between the baseband signal and the words having the steep autocorrelation characteristic and a correlation between the baseband signal and sync words included in the frames.

With this measure, frame synchronization can be performed in a stable manner with high reliability even in the case where many bit errors may occur in sync words due to disturbance or deterioration in the transmission-characteristic of a transmission channel.

This results in maintaining high and stable reliability and transmission quality.

The principle of a 10th radio receiver according to the invention is as follows.

The synchronizing section 12 performs frame synchronization based on a correlation between the baseband signal and sync words included in the frames and also performs frame synchronization based on a correlation between the baseband signal and the words indicated by the sequence of first vectors.

With this measure, frame synchronization is performed at a high frequency at a cycle that is shorter than the length of frames based on one of sync words and the words that are regarded as known information like the sync words are.

This improves the reliability and the transmission quality.

The principle of an 11th radio receiver according to the invention is as follows.

The frequency deviation suppressing section 17 keeps a frequency of the local frequency signal used for the quasi-synchronous or synchronous detection at such a value that a variation rate of a phase of the error obtained by the channel inferring section 15 is suppressed, or corrects the frequency of the local frequency signal to the value in the baseband domain.

A phase variation in the above-mentioned error is, in general, caused by a frequency deviation of the local frequency signal used for the quasi-synchronous or synchronous detection, and has a value that is proportional to the frequency deviation.

This increases the accuracy and the stability of the quasi-synchronous or synchronous detection and maintains high transmission quality.

The principle of a 12th radio receiver according to the invention is as follows.

The speed detecting section 18 determines a speed of a transmitting end of the signal based on a frequency at which a cross-correlation between the sequence of first vectors and the sequence of second vectors extracted by the vector extracting section 14 and symbol positions indicating the words and known words to be indicated by the first vectors and the second vectors, respectively, varies.

With this measure, a speed of the transmitting end is reliably determined in a stable manner even in the case where sync words included in respective frames may have a lot of bit errors due to disturbance or deterioration in transmission-characteristic.

This improves the reliability of channel control and call setting performed according to procedures that conform to the speed of the transmitting end, and maintains high reliability and service quality.

The principle of a 13th radio receiver according to the invention is as follows.

The particular symbol positions are given according to one or both of a channel control procedure and a call setting procedure.

With this measure, the transmission quality and the reliability are kept high in a stable manner by utilizing the words as known information in the signal space even in the case where one or both of known information such as a sync word included in each frame and the words are set or updated according to the channel control procedure or the call setting procedure.

The principle of a 14th radio receiver according to the invention is as follows.

The particular symbol positions are known symbol positions that are known to be included in both of the sequence of first vectors and the sequence of second vectors.

Since the processing of identifying the particular symbol positions can be omitted, the amount of processing necessary for the channel inference can be reduced and the efficiency of the channel inference can be increased.

The principle of a 15th radio receiver according to the invention is as follows.

The number of the particular symbol positions is set to a larger value as the signal modulated with the frame has lower quality.

With this measure, the processing of identifying the particular symbol positions is performed efficiently with high reliability without the need for securing an unduly large amount of processing unless the quality of the signal deteriorates to a large extent.

Therefore, the average transmission quality and performance are kept high.

The principle of a 16th radio receiver according to the invention is as follows.

The vector extracting section 14 determines sequences of first vectors in order for each sequence of a minimum number of symbols whose autocorrelation characteristic can be regarded as steep.

With this measure, a sequence of first vectors to be used for the channel inference is determined at a high frequency even if the words are not collected nor packed over the word length of the words or the frame period as long as the autocorrelation characteristic is assured.

This enables flexible adaptation to a variety of frame formations and increases the frequency of the channel inference.

The principle of a 17th radio receiver according to the invention is as follows.

The vector extracting section 14 determines sequences of first vectors in order for each sequence of a number of symbols that conforms to one or both of a channel control procedure and a call setting procedure.

That is, the channel inference is performed at a frequency that conforms to forms of channel control and call setting even in the case where the above words may be updated during the course of the channel control or call setting.

This enables flexible adaptation to radio transmission systems having a variety of configurations.

The principle of a 18th radio receiver according to the invention is as follows.

The particular-slot identifying section 19 identifies a sequence of particular slots that conform to one or both of the channel control procedure and the call setting procedure and in which the words should be uniform. The transmission-characteristic compensating section 16 compensates, for each sequence of particular slots identified by the particular-slot identifying section 19, all or part of symbols indicating the sequence of particular slots for an error that is obtained first by the channel inferring section 15.

With this measure, the channel inference processing of repeatedly determining an error can be omitted in a period when the words are not updated.

This simplifies the processing to be performed by the channel inferring section 15 and the transmission-characteristic compensating section 16 unless such a period becomes unduly long.

The principle of a 19th radio receiver according to the invention is as follows.

The channel inferring section 15 omits to repeat processing of obtaining an error for each sequence of particular slots identified by the particular-slot identifying section 19.

With this measure, unnecessary processing, which is obtaining errors not referred to by the transmission-characteristic compensating section 16, is not performed.

This reduces the average processing amount and power consumption.

The principle of a 20th radio receiver according to the invention is as follows.

The vector extracting section 14 omits to repeat processing of extracting a sequence of first vectors for each sequence of particular slots identified by the particular-slot identifying section 19.

With this measure, a sequence of first vectors is not extracted in a period when the transmission-characteristic compensating section 16 does not compensate for the error at all.

Therefore, the average processing amount and power consumption can be reduced.

Embodiments of the invention will be hereinafter described with reference to the drawings.

Figure 2:
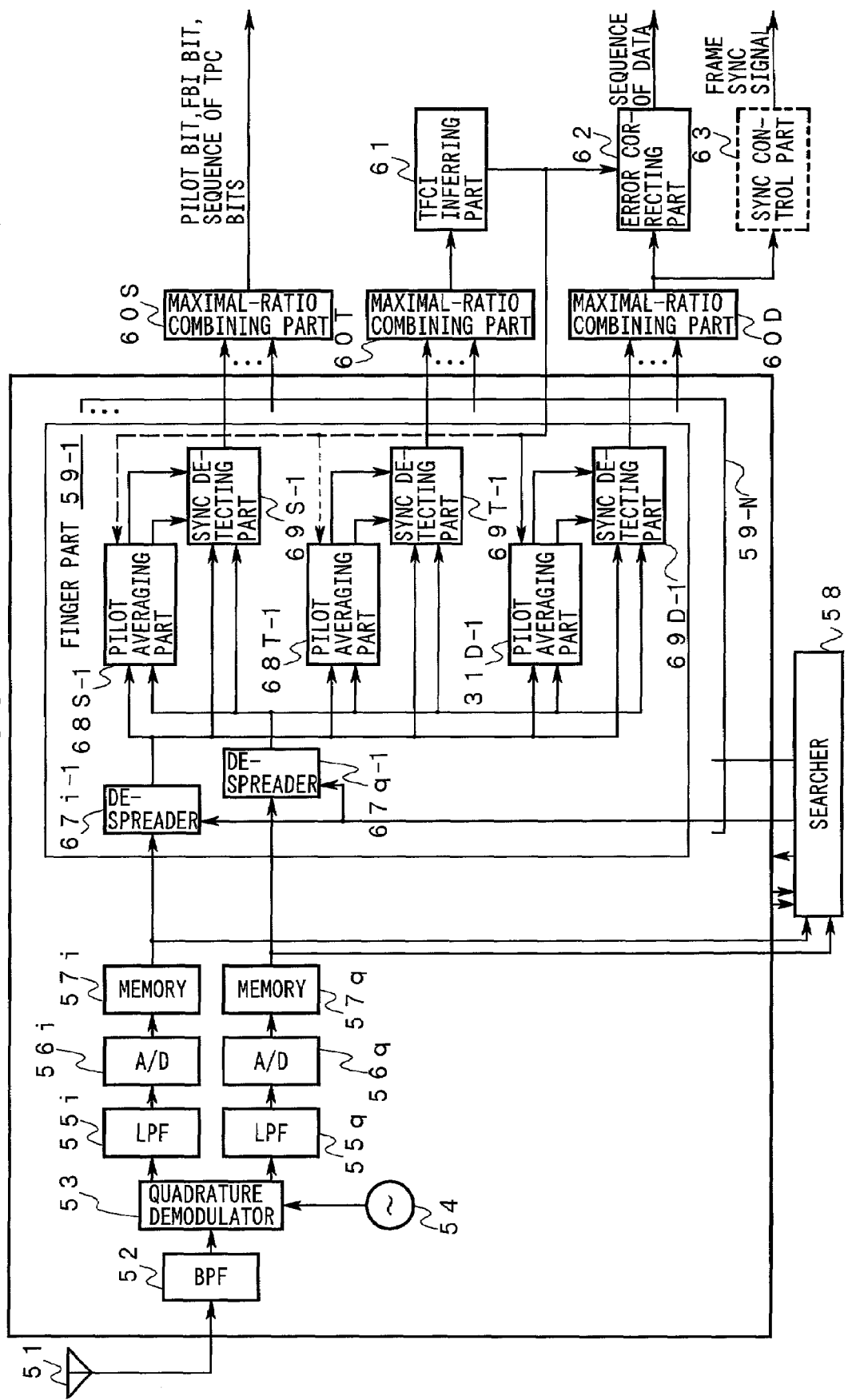
FIG. 2 is a block diagram showing a first embodiment of the invention.

FIG. 2 shows a first embodiment of the invention.

In this embodiment, pilot averaging parts 31D-1 to 31D-N are provided in place of the pilot averaging parts 68D-1 to 68D-N and the output of the TFCI inferring part 61 is connected to the control inputs of the respective pilot averaging parts 31D-1 to 31D-N.

FIG. 3 shows the operation of the first embodiment of the invention.

The operation of the first embodiment of the invention will be described below with reference to FIG. 2 and FIGS. 3A and 3B.

Figure 3A:
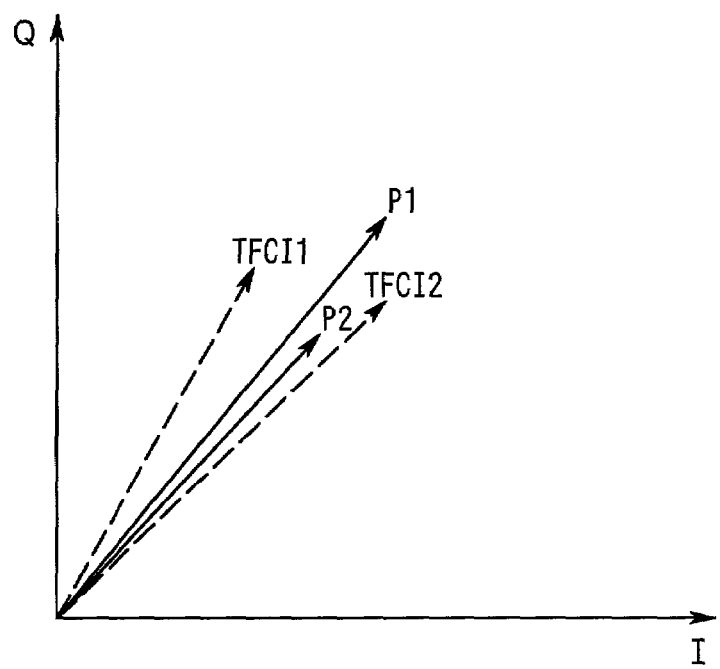
FIGS. 3A and 3B are graphs showing operation of the first embodiment of the invention.
Figure 3B:
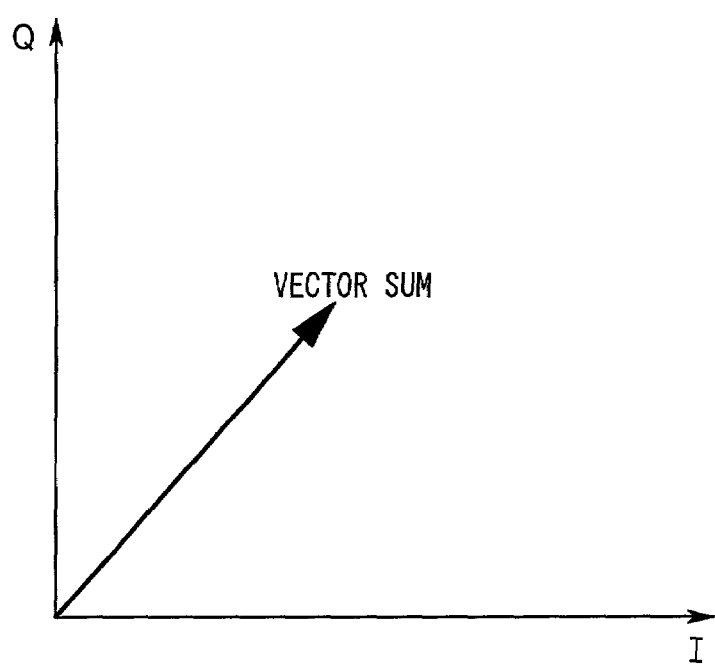

In the finger part 59-C, the pilot averaging part 31D-C determines, in accordance with an inferred TFCI pattern supplied from the TFCI inferring part 61, the following items that conform to frame and slot structures (formations) that are determined uniquely for a string of TFCI bits as shown in FIGS. 3A and 3B:

Symbol positions (hereinafter referred to as "common symbol positions") that are included in both of symbol positions indicating PILOT bits and those indicating TFCI bits among the symbol positions that can be taken by a despread signal q-C in the signal space.

A combination of symbol positions (hereinafter referred to as "reference symbol positions") that should be referred to in channel inference (described later) among the above common symbol positions.

An operation procedure that should be used for calculating an average value of deviations that vectors (hereinafter referred to as "reference vectors") that are located in the vicinity of the respective reference symbol positions belonging to the above combination among vectors indicating a despread signal q-C in the signal space symbol by symbol have with respect to the respective associated reference symbol positions.

For example, an average value of such deviations may be calculated according to any of the following operation procedures:

(a) Calculates deviations of all reference vectors with respect to associated reference symbol positions and calculates an average of those deviations.

(b) Maps all or part of reference symbol positions and reference vectors located in the vicinity of the respective reference symbol positions in a prescribed quadrant or region including a particular symbol position (may correspond to either any of or none of the reference symbol positions) in the signal space, and calculates an average of deviations of only the reference vectors located in the quadrant or region.

(c) Calculates an average of deviations of only reference vectors located in a quadrant or region including a particular reference symbol position in the signal space.

For example, a deviation as described above may not include a component relating to one of the amplitude and the phase as long as it conforms to a modulation scheme used.

Further, cooperating with the searcher 58 as in the case of the conventional example, the pilot averaging part 31D-C performs channel inference by calculating an average of differences (hereinafter referred to merely as "deviations") of reference vectors P1, P2, . . . , TFCI1, TFCI2, . . . indicating the despread signal q-C in periods of the fields to accommodate PILOT bits and TFCI bits among the fields of each slot with respect to the associated reference symbol positions according to the above-described operation procedure and the above-mentioned WMSA scheme in a manner shown in FIGS. 3A and 3B, for example.

As described above, in this embodiment, channel inference is performed by the operation of calculating a deviation of a vector sum of reference vectors indicating, symbol by symbol, not only PILOT bits but also TFCI bits that have been inferred based on a steep autocorrelation characteristic (described above) even if decision decoding has not been performed.

Therefore, the reliability of the channel inference and the transmission quality are made higher than in the conventional example in which such a deviation is calculated with attention paid to only a demodulation signal indicating PILOT bits without altering a configuration to a large extent.

In this embodiment, an operation procedure (described above) is determined based on an inferred TFCI pattern that has been determined by the TFCI inferring part 61.

However, the invention is not limited to such a configuration. For example, where an operation procedure to be used is predetermined irrespective of an inferred TFCI pattern or is specified properly by some component of a system or an apparatus to which the invention is applied, the channel inference may be performed according to such an operation procedure.

An operation procedure to be used in the invention is not limited to the operation procedures of items (a)–(c); any operation procedure may be used as long as it complies with a modulation scheme and a multiple access scheme used and can attain desired transmission quality and response speed.

In this embodiment, common symbol positions and a combination of reference symbol positions (both described above) are determined merely as items that conform to frame and slot structures that are uniquely determined for an inferred TFCI pattern.

However, the invention is not limited to such a configuration. For example, all or part of one or both of common symbol positions and a combination of reference symbol positions may be determined according to channel control and call setting procedures irrespective of relevance to an inferred TFCI pattern.

In this embodiment, no processing relating to setting of the number(s) of one or both of common symbol positions and reference symbol positions is performed.

However, the invention is not limited to such a configuration. For example, the above numbers may be set at larger values when transmission quality (i.e., a traffic distribution and a degree of congestion relating to one or both of a desired wireless zone (cell) and a radio base station) that is recognized according to channel control and call setting procedures is lower, to reduce and secure, in a stable manner, the amount of processing required for inference of a radio channel having high transmission quality.

Further, in this embodiment, the channel inference is performed in such a manner that TFCI bits that are packed with partial TFCI bits that are distributed to 15 slots that constitute each frame and arranged continuously in time-series order are determined by the TFCI inferring part 61 and symbol-by-symbol deviations that accompany a despread signal indicating TFCI bits and PILOT bits are averaged on a frame-by-frame basis.

However, for example, if one of the following conditions is satisfied, the time necessary for the channel inference and the cycle of the channel inference may be shortened by setting the cycle of the channel inference shorter than the frame period:

It is possible to infer (determine) TFCI bits in units of a word length that is shorter than the sum of word lengths of TFCI fields in each slot constituting a frame.

Partial TFCI bit strings to which TFCI bits are distributed also exhibit a steep autocorrelation characteristic (mentioned above) and inference can be performed based on the autocorrelation characteristic.

The time necessary for the channel inference and the cycle of the channel inference may be varied according to channel control and call setting procedures, for example.

Where the time necessary for the channel inference and the cycle of the channel inference are varied according to channel control and call setting procedures, the word length, the Hamming distance, and other attributes of a code sequence indicating TFCI bits may be updated as appropriate, to enable flexible adaptation to a variety of zone configurations, channel configurations, and channel allocation and other specifications.

FIG. 4 shows second to fifth embodiments of the invention.

In the second embodiment of the invention, as indicated by broken lines in FIG. 4, a sync control part 32 is provided in place of the sync control part 63 and the output of the TFCI inferring part 61 is connected to a corresponding input of the sync control part 32.

The operation of the second embodiment of the invention will be described below with reference to FIG. 4.

The sync control part 32 generates standard vectors that indicate, according to a frame formation, in time-series order, a known frame sync pattern (FSW) and an inferred TFCI pattern obtained by the TFCI inferring part 61 and also indicate a sequence of regular symbol positions that should be indicated, frame by frame, according to a prescribed frame formation, by a demodulation signal DRAKE generated by the maximal-ratio combining part 60D.

Further, the sync control part 32 correlates the generated standard vectors with the demodulation signal DRAKE and generates a frame sync signal indicating time points when the correlation result exceeds a prescribed threshold and has a local maximum.

That is, in this embodiment, a frame sync signal is generated based on a correlation between a demodulation signal DRAKE and standard vectors corresponding to a combination of a known frame sync pattern (FSW) and an inferred TFCI pattern that has been inferred with high reliability based on an autocorrelation characteristic (described above) without performing decision decoding.

Therefore, in this embodiment, even in a period when the transmission quality is low, frame synchronization can be performed and maintained in a more stable manner with higher reliability than in the conventional example in which standard vectors are generated based on only a frame sync pattern.

In this embodiment, standard vectors are generated as vectors corresponding to a combination of a frame sync pattern and an inferred TFCI pattern and a single frame sync signal is generated for each frame based on the standard vectors.

However, the invention is not limited to such a configuration. For example, a frame sync signal may be generated as a result of any of the following correlations, to simplify the processing that relates to the generation of a frame sync signal or increase the frequency at which a frame sync check or pulling into frame synchronization can be performed:

Correlation between a demodulation signal DRAKE and standard vectors corresponding to only an inferred TFCI pattern that is calculated on condition that a correlation between values of fields that accommodate an inferred TFCI pattern of each frame and values of the other fields is sufficiently small.

Correlation between a demodulation signal DRAKE and alternately selected ones of two kinds of standard vectors corresponding to a frame sync pattern and an inferred TFCI pattern, respectively.

Any of standard vectors above are not always generated by the same method. For example, where the transmission quality is not compensated sufficiently even if the transmission power is set at a high level in compressed mode transmission, standard vectors may be generated as appropriate by any of various methods that conforms to office data, a subscriber class, and channel control and call setting procedures.

A third embodiment of the invention will be described below.

In this embodiment, the TFCI inferring part 61 performs the following processing.

FIG. 5 is an operation time chart of the third embodiment of the invention.

The operation of the third embodiment of the invention will be described below with reference to FIGS. 4 and 5.

A TTI (transmission time interval) that has been set under channel control that is performed by a processor (not shown), for example, and indicates the number K of frames that are arranged continuously in time-series order and include common TCFI bits is supplied to the TCFI inferring part 61 in synchronism with the head of those frame (indicated by symbol (1) in FIG. 5).

When the TTI that is supplied in the above manner is updated, the TFCI inferring part 61 determines an inferred TFCI pattern as a string of partial TFCI bits that are accommodated in slots that are included in the head frame (or a frame following the head frame) (indicated by symbol (2) in FIG. 5). The TFCI inferring part 61 passes the inferred TFCI pattern to the pilot averaging part 31D-C without repeating the processing of determining an inferred TFCI pattern over a period (hereinafter referred to as "TTI period") of K–1 frames that immediately follow the head frame (indicated by symbol (3) in FIG. 5).

The processing performed by the pilot averaging part 31D-C is the same as in the first embodiment, and hence is not described here.

With the above configuration, the amount of processing that the TFCI inferring part 61 is required to perform is reduced. Further, the pilot averaging part 31D-C can perform the channel inference by repeatedly using an inferred TFCI pattern determined as a result of the above processing.

Therefore, the sync control that should be performed to enable cooperation between the TFCI inferring part 61 and the pilot averaging part 31D-C is simplified, the power consumption is reduced, and the response speed is increased.

In this embodiment, an inferred TFCI pattern obtained by the TFCI inferring part 61 is used only for the channel inference that is performed by the pilot averaging part 31D-C.

However, the invention is not limited to such a configuration. For example, as indicated by a broken line in FIG. 4, an inferred TFCI pattern may also be supplied to the searcher 33. The searcher 33 calculates a correlation between a demodulation signal and despread codes in periods of not only fields accommodating PILOT bits but also fields accommodating TFCI bits. In this manner, a delay profile can be generated with high accuracy.

In this embodiment, a TTI is set and updated according to a channel control procedure.

However, the invention is not limited to such a configuration. For example, a TTI may be provided in prescribed fields of a frame or prescribed slots or given as a bit string that is uniquely determined according to an inferred TFCI pattern, and referred to by the TFCI inferring part 61 when necessary.

Further, in this embodiment, the TFCI inferring part 61 determines a new inferred TFCI pattern at a time point when a TTI has been updated, and continues to supply the new inferred TFCI pattern to the pilot averaging part 31D-C over a period of the succeeding K−1 frames.

However, the invention is not limited to such a configuration. For example, a configuration is possible in which the TFCI inferring part 61 infers, one after another, TFCI patterns included in the respective K−1 frames and the pilot averaging part 31D-C independently holds and refers to an inferred TFCI pattern that is obtained immediately after TTI updating and refrains from referring to the K−1 inferred TFCI patterns thus obtained.

A fourth embodiment of the invention will be described below.

In this embodiment, as indicated by dashed lines in FIG. 4, a frequency-deviation suppressing part 34 is provided between the memories 57i and 57q and the finger parts 59-1 to 59-N and a frequency-deviation inferring part 35 is provided. The three inputs of the frequency-deviation inferring part 35 are connected to the outputs of the maximal-ratio combining parts 60S and 60T and the TFCI inferring part 61, respectively, and the output of the frequency-deviation inferring part 35 is connected to the control input of the frequency-deviation suppressing part 34.

The operation of the fourth embodiment of the invention will be described below with reference to FIG. 4.

The frequency-deviation inferring part 35 is supplied with a PILOT demodulation signal corresponding to fields of PILOT bits that are known based on a prescribed slot formation among the components of a demodulation signal SRAKE that is output from the maximal-ratio combining part 60S, a demodulation signal TRAKE that is output from the maximal-ratio combining part 60T and indicates TFCI bits, and an inferred TFCI pattern determined by the TFCI inferring part 61.

The frequency-deviation inferring part 35 calculates relative phase errors, with respect to symbol positions indicating known PILOT bits and an inferred TFCI pattern in the signal space, included in vectors indicating the PILOT demodulation signal and the demodulation signal TRAKE in the signal space.

Further, the frequency-deviation inferring part 35 calculates a symbol-cycle variation rate of those errors.

The frequency-deviation suppressing part 34 corrects the phases of discrete signals Id and Qd that should be supplied to the finger parts 59-1 to 59-N and the searcher 33 by subtracting a phase that is equal to the calculated variation rate from the phases of the respective discrete signals Id and Qd that are read from the memories 57i and 57q.

The variation rate has a value that is proportional to a frequency deviation of a local frequency signal that was used for quasi-synchronous detection by the quadrature demodulator 53, and is obtained based on errors, in the signal space, in a demodulation signal indicating known PILOT bits and an inferred TFCI pattern that can also be regarded as known like the PILOT bits are.

Therefore, in this embodiment, an error in the frequency of the local frequency signal with respect to the frequency of reception waves arriving at the antenna 51 is suppressed in a stable manner with high reliability.

A fifth embodiment of the invention will be described below.

In this embodiment, as indicated by chain lines in FIG. 4, a speed detecting part 36 for outputting a moving speed (described later) is provided. The speed detecting part 36 has three inputs that are connected to the outputs of the maximal-ratio combining parts 60S and 60T and the TFCI inferring part 61, respectively.

The operation of the fifth embodiment of the invention will be described below with reference to FIG. 4.

The speed detecting part 36 calculates relative phase errors, with respect to symbol positions indicating known PILOT bits and an inferred TFCI pattern in the signal space, included in vectors indicating a PILOT demodulation signal (described above) and a demodulation signal TRAKE in the signal space, and calculates an amplitude distribution of the errors on the time axis.

Further, the speed detecting part 36 calculates an interval ΔT on the time axis with which the amplitude distribution has a local maximum (or a local minimum), and calculates a moving speed of the transmitting end of the reception waves arriving at the antenna 51 by multiplying the interval ΔT by a prescribed proportionality factor.

The moving speed is obtained as a reduced value of a variation of amplitude components of errors, in the signal space, in a demodulation signal indicating known PILOT bits and an inferred TFCI pattern that can also be regarded as known like the PILOT bits are.

Therefore, in this embodiment, a moving speed of the transmitting end of reception waves arriving at the antenna 51 is calculated more accurately than in a case that amplitude components of errors, in the signal space, in a demodulation signal indicating only PILOT bits are converted.

In each of the above embodiments, the invention is applied to a receiving system that is provided in a radio base station of a mobile communication system employing the CDMA scheme and that performs RAKE reception.

However, the invention can be applied to any receiving systems irrespective of whether channel decoding or decision decoding is performed as long as synchronization with reception waves that are modulated with a sequence of frames each being a slot sequence is performed based on slot and frame formations and the reception waves can be demodulated in the synchronized state.

In each of the above embodiments, the output of the TFCI inferring part 61 is connected to only the pilot averaging part 31D-C among the pilot averaging parts 68S-C, 68T-C, and 31D-C.

However, the invention is not limited to such a configuration. For example, the output of the TFCI inferring part 61 may be connected to one or both of the pilot averaging parts 68S-C and 68T-C as indicated by a dashed line and a broken line in FIGS. 2 and 4, to improve the quality and increase the response speed of a channel that is used for transmission of PILOT bits, FBI bits, TPC bits, and TFCI bits.

In each of the above embodiments, quasi-synchronous detection is performed by the quadrature demodulator 53 and symbol-by-symbol errors resulting from deviations in phase and frequency of a local frequency signal that is generated by the local oscillator 54 and used for the quasi-synchronous detection are corrected by the sync detecting parts 69S-C, 69T-C, and 69D-C.

However, the invention is not limited to such a configuration. For example, a configuration is possible in which one of the pilot averaging parts 68S-C, 68T-C, and 68D-C corrects the frequency and phase of a local frequency signal together and the quadrature demodulator 53 performs synchronous detection using a resulting local frequency signal.

In each of the above embodiments, the invention is applied to the radio receiver that is provided in a radio base station of a mobile communication system employing the CDMA scheme and that performs RAKE reception.

Figure 6:
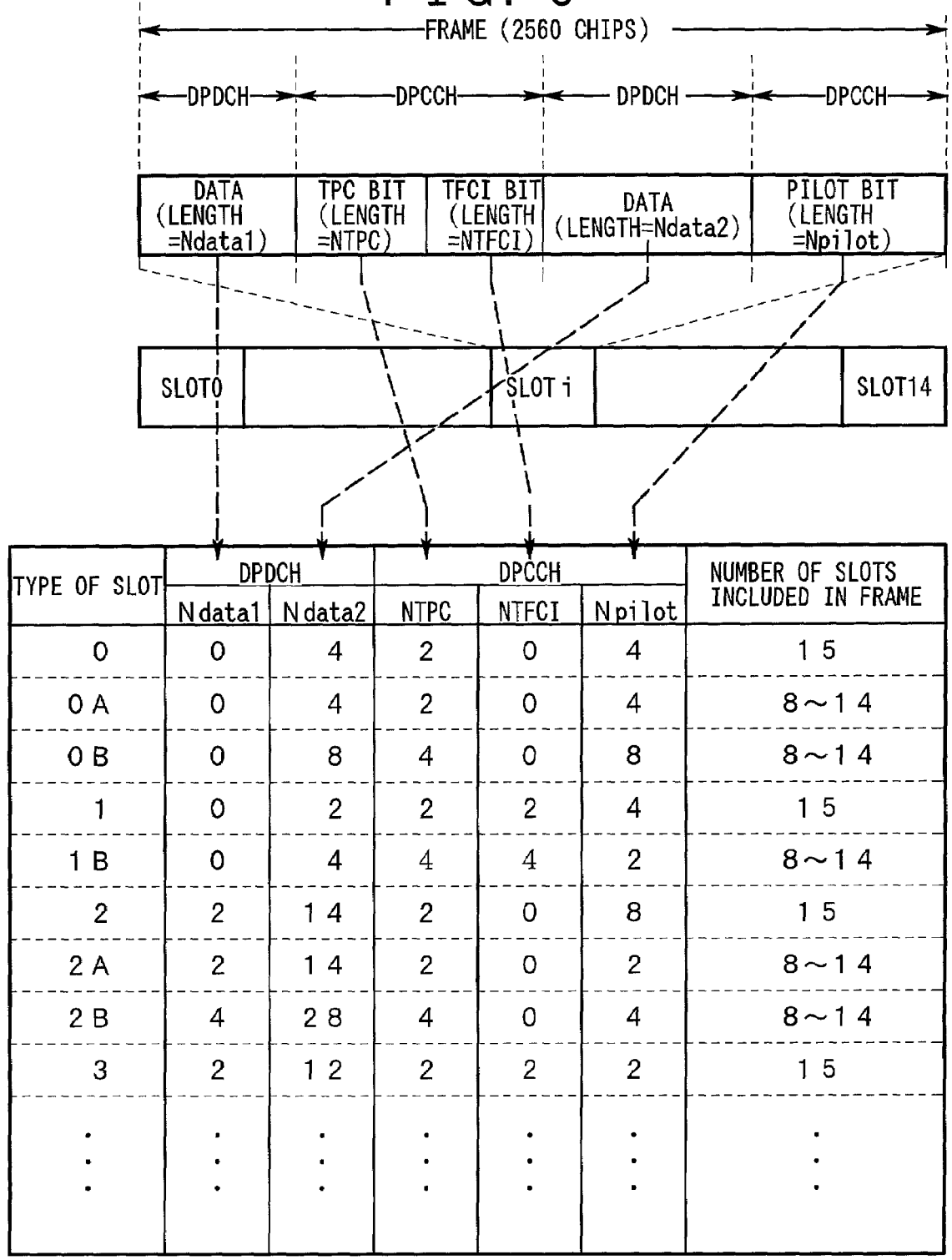
FIG. 6 is a chart showing a frame formation that is applied to a downstream link.
Figure 7:
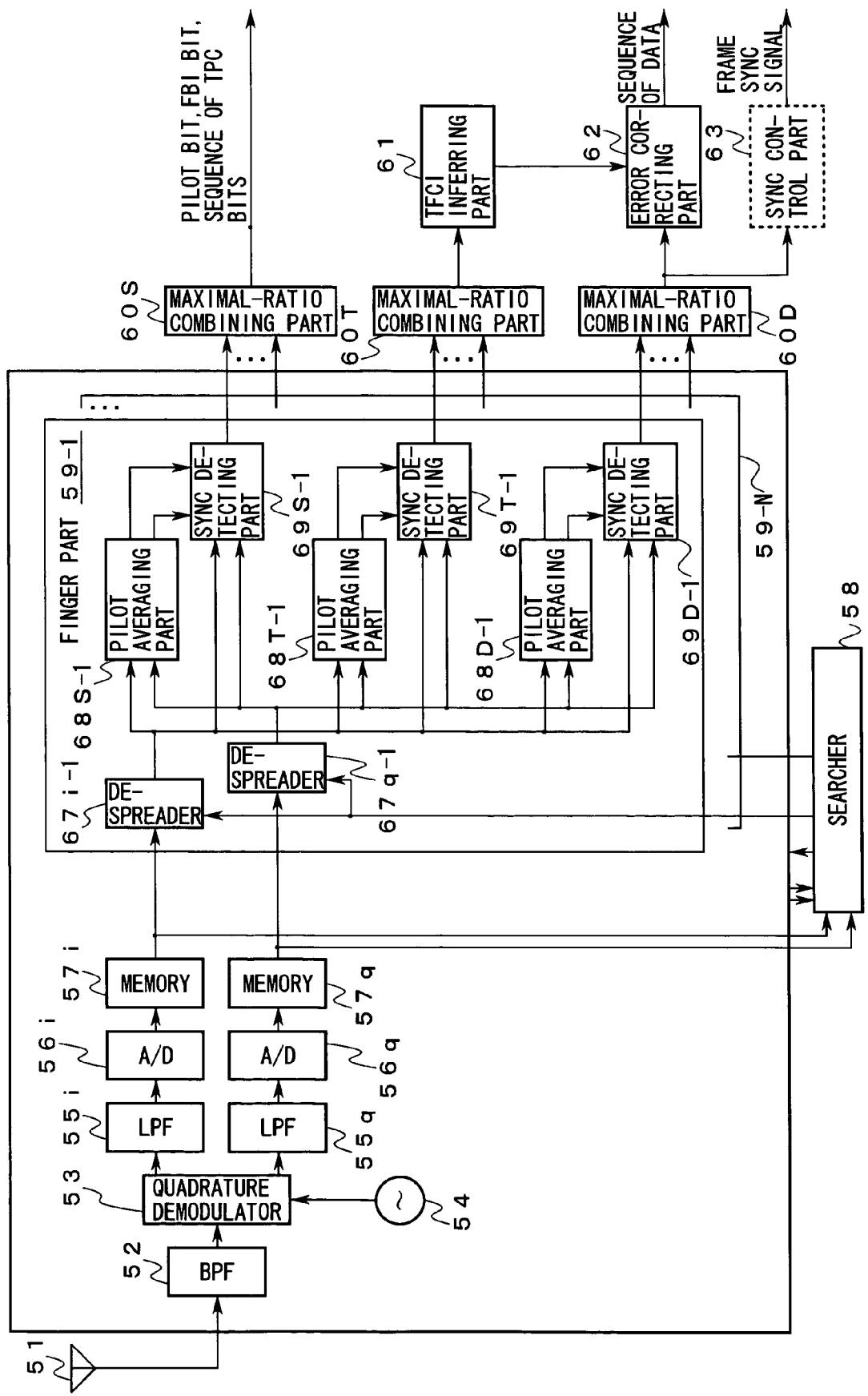
FIG. 7 is a block diagram showing the configuration of an exemplary radio receiver that is provided in a radio base station of a mobile communication system to which the CDMA is applied.

However, the invention is not limited to radio receivers that are provided in such radio base stations. For example, the invention can similarly be applied to a terminal (mobile station apparatus) for receiving reception waves that are modulated with frames having a formation shown in FIG. 6 as long as it is to receive reception waves that are modulated with frames each being a sequence of a plurality of slots that accommodate known PILOT bits and bits corresponding to TFCI bits.

In each of the above embodiments, the three pilot averaging parts 68S-C, 68T-C, and 31D-C are provided in the finger part 59-C.

However, the pilot averaging parts 68S-C, 68T-C, and 31D-C may be combined with each other in any form as long as the above-described processes that are executed by the pilot averaging parts 68S-C, 68T-C, and 31D-C are executed with desired accuracy at desired speeds.

In each of the above embodiments, TFCI bit strings are used as information that can be inferred with high reliability without performing any decision decoding and can be regarded as known information like PILOT bit strings are.

However, the invention is not limited to the case of using such TFCI bits. Any information can be used in place of or together with such TFCI bits as long as they are words with which fields to be extracted from frames and slots can be determined reliably even if the frame and slot formations may vary and that can be inferred with high reliability without the need for performing decision decoding by virtue of its steep autocorrelation characteristic and small and gentle cross-correlation characteristic.

In each of the above embodiments, none of the TFCI bits in a slot are combined with any bit or word accommodated in a field adjacent to the TFCI bits and all the TFCI bits in a slot correspond to regular symbol position in the signal space.

However, the invention is not limited to such a configuration. For example, where a head or tail TFCI bit does not correspond to any regular symbol position unless it is combined with some bits or word in an adjacent field, a partial TFCI bit string that does not include one or both of the head and tail TFCI bits may be used in place of the TFCI bits concerned, to accommodate a variety of frame formations, modulation schemes, and multiple access schemes.

Further, in each of the above embodiments, the invention is applied to a mobile communication system employing the CDMA scheme.

However, the invention is not limited to radio transmission systems of the CDMA scheme, and can be applied to a variety of radio transmission schemes irrespective of the multiple access scheme and modulation scheme used and whether RAKE reception is performed.

The invention is not limited to the above embodiments and various modifications may be made without departing from the spirit and the scope of the invention. Any improvement may be made in part or all of the components.

What is claimed is:

1. A radio receiver comprising:
a detecting section for performing quasi-synchronous detection on a signal that is modulated with a frame, and for outputting a baseband signal, the frame being a sequence of slots each of which includes known information and possibly includes words having a steep autocorrelation characteristic and a small and gentle crass-correlation characteristic;
a synchronizing section for performing frame synchronization with a frame indicated by said baseband signal;
a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;
a channel inferring section for obtaining an error in said first vectors and said second vectors from deviations of particular symbol positions to be indicated in a signal space by said sequence of first vectors and said sequence of second vectors; and
a transmission-characteristic compensating section for compensating for an error in a vector indicating said baseband signal in said signal space, the error being obtained by said channel inferring second, wherein
said vector extracting section provides a compensation for an error previously obtained by said channel inferring section to said extracted sequence of second vectors.

2. The radio receiver according to claim 1, wherein:
said transmission-characteristic compensating section is structured of a plurality of sections corresponding to respective fingers to be RAKE combined, for compensating in parallel for errors obtained by said channel inferring section for every finger; and
said synchronizing section obtains a delay profile as a distribution, on the time axis, of correlations between said formation of said frame and components indicating said extracted sequences of first vectors and second vectors among components of baseband signals, and performs frame synchronization with said baseband signals based on the delay profile, the baseband signals being received parallel via a radio transmission channel formed as a multipath and through which said signal propagates.

3. The radio receiver according to claim 1, wherein said channel inferring section provides a compensation for the previously obtained error to an error obtained by said channel inferring section.

4. A radio receiver comprising:
a detecting section for performing synchronous detection on a signal that is modulated with a frame, and for outputting a baseband signal, the frame being a sequence of slots each of which includes known information and possibly includes words having a steep autocorrelation characteristic and a small and gentle cross-correlation characteristic;
a synchronizing section for performing frame synchronization with a frame indicated by said baseband signal;
a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;

a channel inferring section for obtaining an error in said first vectors and said second vectors from deviations of particular symbol positions to be indicated in a signal space by said sequence of first vectors and said sequence of second vectors; and a transmission-characteristic compensating section for maintaining one or both of a phase and an amplitude of a local frequency signal used for said synchronous detection at such a value that said obtained error is suppressed, or for correcting one or both of the phase anti the amplitude of the local frequency signal to the value in the baseband domain, wherein said vector extracting section provides a compensation for an error previously obtained by said channel inferring section to said extracted sequence of second vectors.

5. The radio receiver according to claim 1, wherein:
said vector extracting section determines a sequence of words by analyzing said baseband signal based on said autocorrelation characteristic; and
said channel inferring section calculates, in said signal space, an average of deviations of said particular symbol positions to be indicated by said first and second vectors, according to an operation procedure that conforms to the determined sequence of words.

6. The radio receiver according to claim 4, wherein:
said vector extracting section determines a sequence of words by analyzing said baseband signal based on said autocorrelation characteristic; and
said channel inferring section calculates, in said signal space, an avenge of deviations of said particular symbol positions to be indicated by said first and second vectors, according to an operation procedure that conforms to the determined sequence of words.

7. The radio receiver according to claim 1, wherein said vector extracting section extracts, from said words included in said slots, a sequence of first vectors as a sequence of vectors indicating a word which directly corresponds to a symbol position in said signal space and conforms to said formation of said frame and to a modulation scheme used for generating said signal.

8. The radio receiver according to claim 4, wherein said vector extracting section extracts, from said words included in said slots, a sequence of first vectors as a sequence of vectors indicating a word which directly corresponds to a symbol position in said signal space and conforms to said formation of said frame and to a modulation scheme used for generating said signal.

9. The radio receiver according to claim 1, wherein said synchronizing section performs frame synchronization based on a correlation between said baseband signal and said words having a steep autocorrelation characteristic.

10. The radio receiver according to claim 4, wherein said synchronizing section performs frame synchronization based on a correlation between said baseband signal and said words having a steep autocorrelation characteristic.

11. The radio receiver according to claim 1, wherein said synchronizing section performs frame synchronization based on correlations between said baseband signal and said words having a steep autocorrelation characteristic, and between said baseband signal and a sync word included in said frame.

12. The radio receiver according to claim 4, wherein said synchronizing section performs frame synchronization based on correlations between said baseband signal and said words having a steep autocorrelation characteristic, and between said baseband signal and a sync word included in said frame.

13. The radio receiver according to claim 1, wherein said synchronizing section performs frame synchronization based on a correlation between said baseband signal and a sync word included in said frame, and on a correlation between said baseband signal and said words indicated by said sequence of first vectors.

14. The radio receiver according to claim 4, wherein said synchronizing section performs frame synchronization based on a correlation between said baseband signal and a sync word included in said frame, and on a correlation between said baseband signal and said words indicated by said sequence of first vectors.

15. A radio receiver comprising:
a detecting section for performing quasi-synchronous detection on a signal that is modulated with a frame, and for outputting a baseband signal, the frame being a sequence of slots each of which includes known information and possibly includes words having a steep autocorrelation characteristic and a small and gentle cross-correlation characteristic;
a synchronizing section for performing frame synchronization with a frame indicated by said baseband signal;
a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;
a channel inferring section for obtaining an error in said first vectors and said second vectors from deviations of particular symbol positions to be indicated in a signal space by said sequence of first vectors and said sequence of second vectors;
a transmission-characteristic compensating section for compensating for an error in a vector indicating said baseband signal in said signal space, the error being obtained by said channel inferring section; and
a frequency deviation suppressing section for maintaining a frequency of a local frequency signal used for said quasi-synchronous detection at such a value that a variation rate of a phase of said obtained error is suppressed, or for correcting said frequency of said local frequency signal to a value in a baseband domain.

16. A radio receiver comprising:
a detecting section for performing synchronous detection on a signal that is modulated with a frame, and for outputting a baseband signal, the frame being a sequence of slots each of which includes known information and possibly includes words having a steep autocorrelation characteristic and a small and gentle cross-correlation characteristic;
a synchronizing section for performing frame synchronization with a frame indicated by said baseband signal;
a vector extracting section for extracting sequence of first vectors and a sequence of second vectors by analyzing said baseband signal based on a formation of said frame, the sequence of first vectors indicating a sequence of words individually included in said slots, the sequence of second vectors indicating said known information included in said slots;
a channel inferring section for obtaining an error in said first vectors and said second vectors from deviations of particular symbol positions to be indicated in a signal space by said sequence of first vectors and said sequence of second vectors;

a transmission-characteristic compensating section for maintaining one or both of a phase and an amplitude of a local frequency signal used for said synchronous detection at such a value that said obtained error is suppressing, or for correcting one or both of the phase and the amplitude of the local frequency signal to the value in the baseband domain; and a frequency deviation suppressing section for maintaining a frequency of a local frequency signal used for said synchronous detection at such a value that a variation rate of a phase of said obtained error is suppressed, or for correcting said frequency of said local frequency signal to a value in a baseband domain.

17. A radio receiver comprising:

a detecting section for performing quasi-synchronous detection on a signal that is modulated with a frame, and for outputting a baseband signal, the frame being a sequence of slots each of which includes known information and possibly includes words having a steep autocorrelation characteristic and a small and gentle cross-correlation characteristic;

a synchronizing section for performing frame synchronization with a frame indicated by said baseband signal;

a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;

a channel inferring section for obtaining an error in said first vectors and said second vectors from deviations of particular symbol positions to be indicated in a signal space by said sequence of first vectors and said sequence of second vectors;

a transmission-characteristic compensating section for compensating for an error in a vector indicating said baseband signal in said signal space, the error being obtained by said channel inferring section; and a speed detecting section for determining a speed of a transmitting end of said signal modulated with said frame according to a frequency at which a cross-correlation between said extracted sequences of first and second vectors and symbol positions varies, the symbol positions signifying a word and known information to be indicated by said first and second vectors, respectively.

18. A radio receiver comprising:

a detecting section for performing synchronous detection on a signal that is modulated with a frame, and for outputting a baseband signal, the frame being a sequence of slots each of which includes known information and possibly includes words having a steep autocorrelation characteristic and a small and gentle cross-correlation characteristic;

a synchronizing section for performing frame synchronization with a frame indicated by said baseband signal;

a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;

a channel inferring section for obtaining an error in said first vectors and said second vectors from deviations of particular symbol positions to be indicated in a signal space by said sequence of first vectors and said sequence of second vectors;

a transmission-characteristic compensating section for maintaining one of both of a phase and an amplitude of a local frequency signal used for said synchronous detection at such a value that said obtained error is suppressed, or for correcting, one or both of the phase and the amplitude of the local frequency signal to the value in the baseband domain; and a speed detecting section for determining a speed of a transmitting end of said signal modulated with said frame according to a frequency at which a cross-correlation between said extracted sequences of first and second vectors and symbol positions varies, the symbol positions signifying a word and known information to be indicated by said first and second vectors, respectively.

19. The radio receiver according to claim 1, wherein said particular symbol positions are given according to one or both of a channel control procedure and a call setting procedure.

20. The radio receiver according to claim 4, wherein said particular symbol positions are given according to one or both of a channel control procedure and a call setting procedure.

21. The radio receiver according to claim 1, wherein said particular symbol positions are known and known to be included in both of said sequence of first vectors and said sequence of second vectors.

22. The radio receiver according to claim 4, wherein said particular symbol positions are known and known to be included in both of said sequence of first vectors and said sequence of second vectors.

23. The radio receiver according to claim 1, wherein the number of said particular symbol positions is set to a larger value as said signal modulated with said frame has a lower quality.

24. The radio receiver according to claim 4, wherein the number of said particular symbol positions is set to a larger value as said signal modulated with said frame has a lower quality.

25. The radio receiver according to claim 1, wherein said vector extracting section determines said sequence of first vectors in order for each sequence of a minimum number of symbols to have at least one autocorrelation characteristic that is likely to be considered steep.

26. The radio receiver according to claim 4, wherein said vector extracting section determines said sequence of first vectors in order for each sequence of a minimum number of symbols to have at least one autocorrelation characteristic that is likely to be considered steep.

27. The radio receiver according to claim 25, wherein said vector extracting section determines said sequence of first vectors in order for each sequence of a number of symbols to conform to one or both of a channel control procedure and a call setting procedure.

28. The radio receiver according to claim 26, wherein said vector extracting section determines said sequence of first vectors in order for each sequence of a number of symbols to conform to one or both of a channel control procedure and a call setting procedure.

29. A radio receiver comprising:

a detecting section for performing quasi-synchronous detection on a signal that is modulated with a frame, and for outputting a baseband signal, the frame being sequence of slots each of which includes known information and possibly includes words having a steep autocorrelation characteristic and a small and gentle cross-correlation characteristic;

a synchronizing section for performing frame synchronization with a frame indicated by said baseband signal;

a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;

a channel inferring section for obtaining an error in said first vectors and said second vectors from deviations of particular symbol positions to be indicated in a signal space by said sequence of first vectors and said sequence of second vectors;

a transmission-characteristic compensating section for compensating for an error in a vector indicating said baseband signal in said signal since, the error being obtained by said channel inferring section, wherein said vector extracting section determines said sequence of first vectors in order for each sequence of a minimum number of symbols to have at least one autocorrelation characteristic that is likely to be considered steep, and said vector extracting section determines said sequence of first vectors in order for each sequence of a number of symbols to conform to one or both of a channel control procedure and a call setting procedure: said radio receiver further comprising:

a particular-slot identifying section for identifying a sequence of particular slots that conform to one or both of said channel control procedure and said call setting procedure and in which said words are to be uniform, and wherein said transmission-characteristic compensating section compensates all or part of symbols indicating said sequence of particular slots for an error obtained first by said channel inferring section for the identified sequence of particular slots.

30. A radio receiver comprising:

a detecting section for performing synchronous detection on a signal that is modulated with a frame, and for outputting a baseband signal, the frame being a sequence of slots each of which includes known information and possibly includes words having a steep autocorrelation characteristic and a small and gentle cross-correlation characteristic;

a synchronizing section for performing frame synchronization with a frame indicated by said baseband signal;

a vector extracting section for extracting a sequence of first vectors and a sequence of second vectors by analyzing said baseband signal based on a formation of said frame, the sequence of first vectors indicating a sequence of words individually included in said slots, the sequence of second vectors indicating said known information included in said slots;

a channel inferring section for obtaining an error in said first vectors and said second vectors from deviations of particular symbol positions to be indicated in a signal space by said sequence of first vectors and said sequence of second vectors;

a transmission-characteristic compensating section for maintaining one or both of a phase and an amplitude of a local frequency signal used for said synchronous detection at such a value that said obtained error is suppressed, or for correcting one or both of the phase and the amplitude of the local frequency signal to the value in the baseband domain, wherein said vector extracting section determines said sequence of first vectors in order for each sequence of a minimum number of symbols to have at least one autocorrelation characteristic that is likely to be considered steep, said vector extracting section determines said sequence of first vectors in order for each sequence of a number of symbols to conform to one or both of a channel control procedure and a call setting procedure; said radio receiver further comprising:

a particular-slot identifying section for identifying a sequence of particular slots that conform to one or both of said channel control procedure and said call setting procedure and in which said words are to be uniform, and wherein said transmission-characteristic compensating section compensates all or part of symbols indicating said sequence of particular slots for an error obtained first by said channel inferring section for the identified sequence of particular slots.

31. The radio receiver according to claim 29, wherein said channel inferring section omits to repeat processing of obtaining an error for said identified sequence of particular slots.

32. The radio receiver according to claim 30, wherein said channel inferring section omits to repeat processing of obtaining an error for said identified sequence of particular slots.

33. The radio receiver according to claim 29, wherein said vector extracting section omits to repeat processing of extracting a sequence of first vectors far said identified sequence of particular slots.

34. The radio receiver according to claim 30, wherein said vector extracting section omits to repeat processing of extracting a sequence of first vectors for said identified sequence of particular slots.

35. The radio receiver according to claim 31, wherein said vector extracting section omits to repeat processing of extracting a sequence of first vectors for said identified sequence of particular slots.

36. The radio receiver according to claim 32, wherein said vector extracting section omits to repeat processing of extracting a sequence of first vectors for said identified sequence of particular slots.

* * * * *